Patented Mar. 21, 1950

2,500,972

UNITED STATES PATENT OFFICE 2,500,972

PRODUCTION OF CLAY COATED SHEET MATERIAL

Alfred D. Wilson, Westbrook, Maine, assignor to S. D. Warren Company, Boston, Mass., a corporation of Massachusetts No Drawing. Continuation of application Serial No. 396,606, June 4, 1941. This application February 14, 1945, Serial No. 577,935

5 Claims. (Cl. 106—148)

This invention relates to the production of clay-coated sheet material, e. g. paper and the like. Specifically, it pertains to clay-coated paper in which the required ratio of adhesive to clay is decreased by treatment given the clay as part of the process disclosed.

In the manufacture of mineral-coated paper it is very common to use china clay for at least part of the mineral component in the coating. The clay is applied to the surface of a paper web or body-stock in the form of an aqueous slurry which also contains a dispersed adhesive substance, generally casein dissolved by alkali. The function of the mineral component of the coating is to provide a high-grade surface for printing; the function of the adhesive is to bind the particles of pigment to each other and to the paper-base so that they will not be picked from the web by the tack of the printing-ink when being printed.

Since the cost of adhesive per pound is considerably higher than that of clay, it is apparent that it is desirable to reduce the quantity of adhesive used in a coating to the smallest amount compatible with production of satisfactory coated paper. The present invention provides a method whereby the quantity of adhesive required in a coating composition containing clay may be markedly reduced.

Briefly, the invention contemplates dewatering clay in the presence of a deflocculant, mixing the dewatered clay with water and adhesive to form a coating composition in which the ratio of adhesive to clay is less than normal in usual coatings comprising the same adhesive and same clay which has not been dewatered in the presence of a deflocculant, and coating paper with said coating composition.

During the separation of clay from the various impurities associated with clay in natural deposits, it is customary to suspend the clay in water in a thin slurry, usually in a deflocculated condition, in order to let coarse material settle out. When the separation has proceeded sufficiently, the clay is flocculated by addition of a suitable flocculant, and then filter-pressed to remove water therefrom. After the pressing operation, the filter-cake is further dewatered by evaporation.

In the practice of the present invention it is preferable to take the purified clay as it comes from the filter press, as described in the preceding paragraph, and add thereto a deflocculant such as a soluble pyrophosphate, tetraphosphate, or hexametaphosphate, preferably as a sodium salt, which deflocculant will in general liquefy said filter-cake; then the deflocculated slurry is further concentrated or dewatered to a non-fluid condition, as by evaporation. Advantageously, the clay may be dried in the presence of the deflocculant to a crumbly or powdery condition, or it may, if desired, be dried to substantial dryness. The clay so dewatered in the presence of deflocculant is made into a coating composition with water and adhesive such as casein, starch, glue or the like, and said coating composition is applied to a paper web to produce a coated paper, which is then dried and finished in any desired manner.

It is found that coated paper so produced can be printed upon without picking when the ratio of adhesive to clay is at least 15% and usually 20% less than the ratio required in a similar coating composition in which the clay is not dewatered in the presence of the deflocculant.

As has been previously pointed out the function of adhesive in a paper coating is to bind the pigment. The degree of binding necessary will naturally depend upon the use to which the coated paper is to be put. The quantity of adhesive required depends upon several variables including the nature of the paper base-stock, the particular adhesive used, and the particular pigment used. When reduction of the adhesive requirement of clay is referred to in the present specification or claims it, of course, means a reduction in the adhesive required by clay treated according to the invention over that required by the same clay not so treated, with other variables all remaining constant.

It is obvious that according to the invention treated clay can be used as the sole pigment in the coating composition or it can be admixed with other coating pigments. In either case it will be found that the adhesive required to bind the clay is less for clay treated according to the invention than for the same clay not so treated.

One embodiment of the invention is shown by the following example:

Coarse material was removed by settling from a deflocculated suspension of Georgia clay. The suspension was then flocculated by addition of alum, and filtered on a filter-press. Alum is an acid flocculant. It is a commercial sulphate of aluminum, and its aqueous solution has an acid reaction. It has been and it is standard practice to acidify alkaline deflocculated clay in a suspension by means of alum, in order to reduce the pH of the clay to about 6, and then to separate the acid flocculated clay from the water of the suspension, by means of filter-pressing. Tests have shown that when such acid-flocculated clay is treated with 0.8% of tetrasodium pyrophosphate, calculated on the dry weight of the clay, it requires a weight of tetrasodium pyrophosphate which is equal substantially to 0.5% of the dry weight of the clay, to raise its pH to 7. The filter-cake contained 71% solids. To the filter-cake was added tetra-sodium pyrophosphate in a quantity equal to 0.8% of the dry weight of clay in the filter-cake, together with sufficient water to reduce the solids to 62%, which yielded a very fluid deflocculated slurry. One portion of the deflocculated slurry was kept as a blank. Another portion of the deflocculated slurry was evaporated to a solids content of 90%, at which point the clay appeared dry. The dried clay was then again reduced to 62% solids by addition of water. The two slurries of 62% solids content were tested for casein requirement by a standard test. Dissolved casein was added to each of the two slurries in steps of known magnitude. Sheets of paper were coated after each addition, and the strength of the dried coating was determined. It was found that 9 parts of casein per 100 parts of dry clay of the blank sample was required to give the same degree of adhesion given by 7 parts of casein per 100 parts of dry clay of the sample which had been dried in the presence of the sodium pyrophosphate. The reduction in casein requirement from 9 to 7 amounts to a decrease of over 22%.

This application is a continuation of my application Serial No. 396,606 filed June 4, 1941, now abandoned.

I claim:

1. Paper coating composition comprising water, water-dispersible adhesive, and a clay product which has been produced by dewatering by evaporation to non-fluid condition an aqueous suspension of clay deflocculated with a soluble polyphosphate, said clay product being characterized by an adhesive requirement substantially less than that of the same clay untreated.

2. Paper carrying a coating comprising adhesive and a clay product obtained by dewatering by evaporation to non-fluid condition an aqueous suspension of clay deflocculated with a soluble polyphosphate.

3. Process which comprises drying by evaporation an admixture of a water-wet purified clay and a water-soluble polyphosphate deflocculating agent, mixing the so treated and dried clay product with water and water-dispersible adhesive to form a paper coating composition, applying a layer of the composition to a web of paper, and drying the coated paper web.

4. A paper coating composition composed of water, a water-dispersible adhesive and a treated clay product having a reduced adhesive requirement as a result of having been dewatered by evaporation to non-fluid condition from an aqueous slurry of purified clay deflocculated with a water-soluble polyphosphate.

5. Paper carrying on a surface thereof a coating of a composition composed of adhesive and a treated clay product having a reduced adhesive requirement as a result of having been dewatered by evaporation to non-fluid condition from an aqueous slurry of purified clay deflocculated with a water-soluble polyphosphate.

ALFRED D. WILSON.

REFERENCES CITED

The following references are of record in the file of this patent:

UNITED STATES PATENTS

| Number | Name | Date |
|---|---|---|
| 1,438,587 | Feldenheimer | Dec. 12, 1922 |
| 1,438,588 | Feldenheimer | Dec. 12, 1922 |
| 2,158,987 | Maloney | May 16, 1939 |
| 2,296,066 | Sloan | Sept. 15, 1942 |
| 2,425,231 | Dickerman et al. | Aug. 5, 1947 |

OTHER REFERENCES

Monsanto Technical Bulletin No. P-24, June 15, 1940, pages 1 and 6.